US008003035B2

(12) United States Patent
Ito et al.

(10) Patent No.: US 8,003,035 B2
(45) Date of Patent: Aug. 23, 2011

(54) METHOD OF MANUFACTURING PLUGGED HONEYCOMB STRUCTURE

(75) Inventors: Koichi Ito, Nagoya (JP); Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/509,930

(22) Filed: Jul. 27, 2009

(65) Prior Publication Data

US 2009/0283928 A1 Nov. 19, 2009

Related U.S. Application Data

(63) Continuation of application No. PCT/JP2008/054264, filed on Mar. 10, 2008.

(30) Foreign Application Priority Data

Mar. 20, 2007 (JP) ................................ 2007-073019

(51) Int. Cl.
*B29C 41/20* (2006.01)

(52) U.S. Cl. ........ 264/267; 264/275; 264/512; 264/517; 264/69

(58) Field of Classification Search ........................ None
See application file for complete search history.

(56) References Cited

U.S. PATENT DOCUMENTS

| | | | | |
|---|---|---|---|---|
| 4,550,034 | A * | 10/1985 | Shimrock et al. | 427/243 |
| 5,866,210 | A * | 2/1999 | Rosynsky et al. | 427/294 |
| 5,953,832 | A * | 9/1999 | Rosynsky et al. | 34/403 |
| 6,478,874 | B1 * | 11/2002 | Rosynsky et al. | 118/63 |
| 7,374,792 | B2 * | 5/2008 | Rosynsky et al. | 427/231 |
| 7,476,417 | B2 * | 1/2009 | Dettling et al. | 427/238 |
| 7,521,087 | B2 * | 4/2009 | Rosynsky et al. | 427/231 |
| 7,678,416 | B2 * | 3/2010 | Suzuki et al. | 427/230 |
| 2002/0135107 | A1 * | 9/2002 | Nishi et al. | 264/630 |
| 2004/0001919 | A1 * | 1/2004 | Aderhold et al. | 427/294 |
| 2005/0076991 | A1 * | 4/2005 | Fujita | 156/89.22 |
| 2008/0128082 | A1 | 6/2008 | Masuda et al. | |
| 2008/0164643 | A1 * | 7/2008 | Ito et al. | 264/621 |

FOREIGN PATENT DOCUMENTS

| | | |
|---|---|---|
| JP | A-6-190218 | 7/1994 |
| JP | A-6-190224 | 7/1994 |
| JP | A-2001-300922 | 10/2001 |
| JP | A-2003-170043 | 6/2003 |
| WO | WO 2006/062141 A1 | 6/2006 |

* cited by examiner

*Primary Examiner* — Edmund H. Lee
(74) *Attorney, Agent, or Firm* — Oliff & Berridge, PLC

(57) ABSTRACT

A method of manufacturing a plugged honeycomb structure has a plugging process which includes the steps of: immersing one end (a first end) of a honeycomb base material in a plugging slurry while vibrating the plugging slurry; after bringing an internal part of a cell into a negative pressure and then returning it into an atmospheric pressure, vibrating the plugging slurry to make the plugging slurry enter a first open end of the cell; and drying the plugging slurry having entered the first open end of the cell to form a first plugging portion at the first end.

7 Claims, 3 Drawing Sheets

METHOD OF MANUFACTURING PLUGGED HONEYCOMB STRUCTURE

TECHNICAL FIELD

The present invention relates to a method of manufacturing a plugged honeycomb structure and, further in detail, to a method of manufacturing a plugged honeycomb structure which can preferably be used in a filter such as a diesel particulate filter and in which a predetermined cell is plugged at its end face.

BACKGROUND ART

As a dust-collecting filter typified by a diesel particulate filter (DPF), there is used a filter that is made of ceramics having a honeycomb structure. Such a filter has a structure in which at end faces of a honeycomb structure including a number of cells acting as through channels of fluid, the cells being partitioned and formed by a porous partition wall, adjacent cells are plugged at one end on sides opposite to each other so as to exhibit a checker wise pattern.

When an exhaust gas containing fine grains such as particulates is made to flow in from one end face of this filter (plugged honeycomb structure), this exhaust gas flows in an internal part of the structure from one cell which end on the side of this one end face is not plugged and penetrates the porous partition wall, and enters the other cell which end on the other end face side of the structure is not plugged. Further, fine grains in an exhaust gas are caught at the partition wall on the occasion of penetrating this partition wall, and the purified gas which fine grains have been removed is exhausted from the other end face of the honeycomb structure.

Normally, to manufacture a plugged honeycomb structure of such structure, as is illustrated in FIG. 2, adopted is a method in which a masking film 11 acting as a mask is attached to an end face of a honeycomb base material 10, a slurry supply hole 11*a* is formed in a position corresponding to an open end of a predetermined cell 12 of this masking film 11, an end of the honeycomb base material 10 is immersed in a container in which a plugging slurry 20 is stored, and thereby the plugging slurry 20 is made to enter the open end of the predetermined cell 12 through the slurry supply hole 11*a* of the masking film 11 (for example, refer to Patent Document 1).

There is disclosed a method in which a slurry having thixotropic properties is used as the above-mentioned plugging slurry, and this plugging slurry is made to enter the predetermined cell of the honeycomb base material while it is vibrated (for example, refer to Patent Documents 2 and 3).

[Patent Document 1] Japanese Patent Application (Laid-Open) No. 2001-300922

[Patent Document 2] Japanese Patent Application (Laid-Open) No. 1994-190218

[Patent Document 3] Japanese Patent Application (Laid-Open) No. 1994-190224

DISCLOSURE OF THE INVENTION

When the open end of the predetermined cell (end of the cell) is plugged by the method as is disclosed in Patent Document 1, however, in some cases, the plugging slurry 20 may not enter to the desired depth in the cell 12. In addition, there are some cases in which the depths of the plugging slurry 20 having entered are not uniform, and a problem exists in that it is difficult to manufacture a uniform plugged honeycomb structure. Incidentally, when the depths of entered plugging slurry to enter an internal part of each cell intended to be plugged are non-uniform, fluctuations occur in pressure loss of each cell of the plugged honeycomb structure having been obtained, and faults such as the occurrence of biased amounts of deposition of filtered substances are likely to arise.

In addition, even in the methods disclosed in Patent Documents 2 and 3, there are some cases in which plugging slurry does not necessarily enter to the desired depth in the cell, and entered depths are not uniform.

One of reasons why their entered depths are not uniform is that an air is entrained between the end face of the honeycomb base material and the surface of the above-mentioned slurry when the honeycomb base material is immersed in the plugging slurry. The air to be entrained in such way is present in various states such as grain-like or layer-like states, and the presence of this air impedes the above-mentioned slurry from entering the cell of the honeycomb base material. Then, in the cell where the above-mentioned slurry is impeded from entering owing to the presence of the above-mentioned air, a plugging portion is not sufficiently formed, and skipped plugging (since the formation of the plugging portion is insufficient, a through hole is formed (cell is open)) occurs. In case where the formation of the plugging portion is imperfect as is described above, or there are fluctuations in depth of a plugging portion, the plugged honeycomb structure having been obtained does not sufficiently function as a filter, and thus a significant problem arises.

The present invention has been made in view of such problems of conventional techniques, and has an object of providing a method of manufacturing a plugged honeycomb structure in which a plugging slurry can be made to enter uniformly to the desired depth of a cell, and product defects such as skipped plugging is much less likely to occur. That is, there is provided a method of manufacturing a plugged honeycomb structure by which the plugged honeycomb structure can be manufactured which is provided with plugging portions of uniform lengths and in which no product defects such as skipped plugging occur.

The present inventors, as a result of intensive studies in order to solve the above-mentioned problems, to remove the air having entered (entered air) between the end face of the honeycomb base material and the surface of the plugging slurry or to decrease a reaction force from the air in the cell, which events exert large effects on fluctuations in the depth of plugging portions, found it possible to achieve the above-mentioned objects by providing a plugging process, which includes the steps of: immersing one end (a first end) of the honeycomb base material in the plugging slurry while vibrating the plugging slurry; after bringing an internal part of the cell into a negative pressure and then returning it into an atmospheric pressure, vibrating the plugging slurry to make the plugging slurry enter a first open end of the cell; and drying the plugging slurry having entered the first open end of the cell to form a first plugging portion at the first end. Then, the present inventors reached the completion of the present invention.

That is, according to the present invention, the following method of manufacturing a plugged honeycomb structure is provided.

[1] A method of manufacturing a plugged honeycomb structure to manufacture a plugged honeycomb structure provided with a tubular honeycomb base material in which a plurality of cells is partitioned and formed by a porous partition wall and a plugging portion that is disposed at an open end of the cell, the method comprising a plugging process including the steps of: immersing one end (a first end) of the honeycomb base material in a plugging slurry while vibrating the plugging slurry; after bringing an internal part of the cell into a negative pressure and then returning it into an atmospheric pressure, vibrating the plugging slurry to make the plugging slurry enter a first open end of the cell; and drying the plugging slurry having entered the first open end of the cell to form a first plugging portion at the first end.

[2] The method of manufacturing a plugged honeycomb structure according to the [1], wherein one end of the honeycomb base material is immersed in the plugging slurry to a depth corresponding to a depth of the first plugging portion of the plugged honeycomb structure to be manufactured.

[3] The method of manufacturing a plugged honeycomb structure according to the [1] or [2], further comprising, before the plugging process, a masking process in which a masking film is attached to a first and a second end face of the honeycomb base material, and a slurry supply hole is pierced at a portion corresponding to each of one open end (the first open end) of a predetermined cell and the other open end of the remaining cell, the plugging process including the steps of: after forming the first plugging portion at the first end, immersing a second end on the second end face side of the honeycomb base material in the plugging slurry while vibrating the plugging slurry; after bringing the internal part of the cell into a negative pressure and then returning it into an atmospheric pressure, vibrating the plugging slurry to make the plugging slurry enter a second open end of the cell; and drying the plugging slurry having entered the second open end of the cell to form a second plugging portion at the second end.

[4] The method of manufacturing a plugged honeycomb structure according to the [3], wherein the second end on the second end face side of the honeycomb base material is immersed in the plugging slurry to a depth corresponding to a depth of the second plugging portion of the plugged honeycomb structure.

[5] The method of manufacturing a plugged honeycomb structure according to any one of the [1] to [4], wherein the plugging slurry is vibrated under the conditions that, after the internal part of the cell is brought into a negative pressure and then returned into an atmospheric pressure, and the plugging slurry is vibrated up and down in a vertical direction, with the number of vibrations of 1 to 1,000,000 Hz and an amplitude of 0.001 to 50 mm.

[6] The method of manufacturing a plugged honeycomb structure according to any one of the [1] to [5], wherein the condition of bringing the pressure into a negative pressure is set to be for 0.1 to 60 seconds at 0.1 to 100 kPa.

[7] The method of manufacturing a plugged honeycomb structure according to any one of the [1] to [6], wherein a viscosity of the plugging slurry is 1 to 1,000 dPa·s.

According to the method of manufacturing a plugged honeycomb structure of the present invention, since by bringing the internal part of the cell into a negative pressure, the air having entered (entered air) between the end face of the honeycomb base material and the surface of the plugging slurry when one end of the honeycomb base material is immersed in the plugging slurry can be removed, the plugged honeycomb structure can be manufactured in which the plugging slurry can be made to enter uniformly the internal part of the cell, and product defects such as skipped plugging is much less likely to occur.

DESCRIPTIONS OF REFERENCE NUMERALS

Figure 1A:
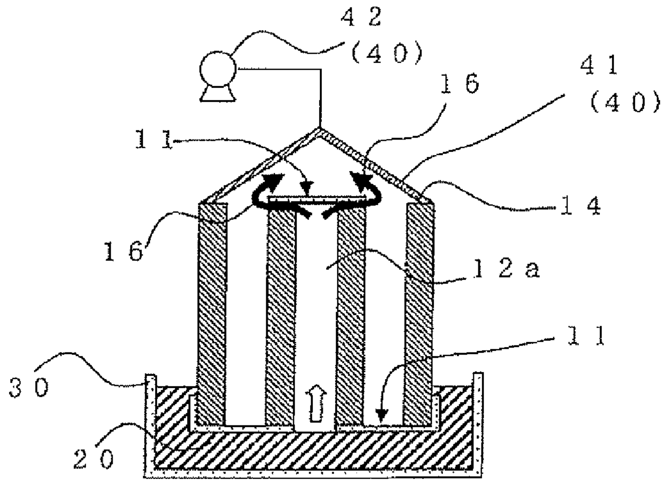
FIG. 1A is a schematic diagram illustrating one embodiment of a method of manufacturing a plugged honeycomb structure according to the present invention.

10: honeycomb base material, 11: masking film, 11*a*: slurry supply hole, 12*a*, 12*b*: cell, 13: a first end face (one end face), 14: a second end face (the other end face), 16, 17: flow of air, 19: a first plugging portion, 20: plugging slurry, 30: ultrasonic generator, 40: negative pressure source unit, 41: funnel, 42: vacuum pump

DESCRIPTION OF THE PREFERRED EMBODIMENT

The preferred embodiments for carrying out the present invention are described below. However, the present invention is not restricted to the following embodiments and it should be construed that there are also included, in the present invention, those embodiments in which appropriate changes, improvements, etc. have been made to the following embodiments based on the ordinary knowledge possessed by those skilled in the art, as long as there is no deviation from the gist of the present invention.

A method of manufacturing a plugged honeycomb structure according to the present embodiment is a method of manufacturing a plugged honeycomb structure to manufacture a plugged honeycomb structure provided with a tubular honeycomb base material in which a plurality of cells is partitioned and formed by a porous partition wall and a plugging portion that is disposed at an open end of the cell, the method containing a plugging process including the steps of: immersing one end (a first end) of the honeycomb base material in a plugging slurry while vibrating the plugging slurry; after bringing an internal part of the cell into a negative pressure and then returning it into an atmospheric pressure, vibrating the plugging slurry to make the plugging slurry enter a first open end of the cell; and drying the plugging slurry having entered the first open end of the cell to form a first plugging portion at the first end.

By the method of manufacturing a plugged honeycomb structure according to the present embodiment, since by bringing the internal part of the cell into a negative pressure, when one end of the honeycomb base material is immersed in the plugging slurry, the air having entered (entered air) between the end face of the honeycomb base material and the surface of the plugging slurry can be removed, the plugged honeycomb structure can be manufactured in which the plugging slurry can be made to uniformly enter the internal part of the cell and product defects such as skipped plugging are much less likely to occur.

[1] Formation of a Honeycomb Base Material:

The honeycomb base material for use in the method of manufacturing a plugged honeycomb structure according to the present embodiment, insofar as it is a tubular one in which a plurality of cells is partitioned and formed by the porous partition wall, is not particularly limited, but may employ, for example, the one that is manufactured by the following method.

In the method of manufacturing the honeycomb base material, first clay for forming the honeycomb base material is formed. This clay is the one that can be obtained by mixing and kneading at least one kind of forming raw material to be selected from a group consisting of cordierite, silicon carbide, sialon, mullite, silicon nitride, zirconium phosphate, zirconia, titania, alumina and silica.

For example, in the case of using a cordierite raw material as the forming raw material, the cordierite raw material is added with a dispersion medium such as water and a pore-forming material, and further added with an organic binder and a dispersant and kneaded to form puddle-like clay. Here, the cordierite raw material means a raw material that will be cordierite by firing, being a ceramic raw material so blended as to be of a chemical composition in the range of 42 to 56% by mass of silica, 30 to 45% by mass of alumina, and 12 to 16% by mass of magnesia. In specific, an example thereof includes the one that contains a plurality of inorganic raw materials selected from talc, kaolin, calcinated kaolin, alumina, aluminum hydroxide, and silica in such proportions as to be of the above-mentioned chemical composition.

The pore-forming material has only to be the one that has properties of coming to be dust and disappeared in a firing process, and may employ an inorganic substance such as cokes or a high molecular compound such as a foamed resin, or an organic substance such as starch in alone, or in combination.

The organic binder may employ hydroxypropyl methylcellulose, methylcellulose, hydroxyethylcellulose, carboxymethylcellulose, polyvinyl alcohol or the like. They may be used alone or in combination of two or more.

Examples of dispersants include ethylene glycol, dextrin, fatty acid soap, a polyalcohol, and the like. They may be used alone or in combination of two or more.

A method of kneading forming raw materials and preparing clay is not particularly limited, and can employ, for example, the method of using a kneader, a vacuum kneading machine or the like.

Next, the clay having been obtained is formed into a honeycomb shape to manufacture a honeycomb formed body. The method of manufacturing the honeycomb formed body is not particularly limited, and can employ conventionally known forming methods such as extrusion forming, injection forming or press forming. A preferred example thereof can include the method of extrusion forming of the clay having been prepared as described above using a die having the desired cell shape, partition wall thickness and cell density.

Incidentally, the entire shape of the honeycomb formed body is not particularly limited, but examples thereof can include a cylindrical shape, a triangular prism, a quadrangular prism or other prisms. Furthermore, there are no particular restrictions on the cell shape of the honeycomb formed body that is the cell shape in a cross section perpendicular with respect to a direction in which an axis of the honeycomb formed body is extended (in a direction in which the cell is extended), but examples thereof can include be a triangular, quadrilateral, or hexagonal shape.

Subsequently, the honeycomb formed body having been manufactured as described above is dried to manufacture the honeycomb base material. This method of drying is not particularly limited, but conventionally known drying methods such as hot air drying, microwave drying, dielectric drying, reduced pressure drying, vacuum drying, freeze drying, or the like can be employed. Among these, from the viewpoint that the entire formed body can be dried rapidly as well as uniformly, a drying method in combination of hot air drying, and microwave drying or dielectric drying is preferred.

[2] Masking Process:

In the method of manufacturing a plugged honeycomb structure according to the present embodiment, before the below-described plugging process, it is preferred to have a masking process in which a masking film is attached to both end faces (that is, a first and a second end face) of the honeycomb base material, as well as a slurry supply hole at portions corresponding to one open end (a first open end) of a predetermined cell and the other open end of the remaining cell of the masking film is pierced. By preliminarily attaching the masking film onto both end faces (the first and second end faces) of the tubular honeycomb base material as described above, productivity and workability can be improved. For example, since a piercing work by the irradiation with a laser beam can be conducted at both end faces at the same time, there are advantages of enabling to shorten a time period and to achieve improvements in productivity. Hereinafter, the masking process will be described specifically.

In the masking process, first the masking film is attached to both end faces (that is, the first and second end faces) of the honeycomb base material.

There are no particular restrictions on the kind of the masking film, but the one which can be melted by heating as well as which can be pierced by the irradiation with a laser beam may be preferred. In addition, from the viewpoint that it can be secured on the end face of the honeycomb base material, it is preferred to use a film having an adhesive layer. A specific example of such a masking film includes a film that is provided with a base material layer that is made of polymer materials such as polyester, polyolefin or a halogenated polyolefin, and an adhesive layer that is made of an acrylic adhesive material and the like to be laminated onto the base material layer. Further, the masking film is preferably 10 to 100 μm in thickness in respect of having a proper strength and being easy to be pierced.

The method of attaching the masking film is not particularly limited, and the film (base material layer) can be attached to both end faces of the honeycomb base material with the adhesive layer as is the film having the above-mentioned adhesive layer.

Next, the slurry supply hole is opened (pierced) at a portion corresponding to one open end (the first open end) of the predetermined cell of the masking film having been attached. The slurry supply hole functions as an inflow port for allowing the plugging slurry to flow in the predetermined cell in a plugging process. Incidentally, the opening area of the slurry supply hole is preferably 30 to 100% with respect to the opening area of the opening of a cell owing to that the plugging slurry can be entered well, further preferably the above-mentioned opening area 40 to 100%, particularly preferably 50 to 100%.

The method of opening the slurry supply hole in the masking film is not particularly limited, but examples thereof include the method of forming the through hole by laser irradiation (laser marker), the method of forming a through hole one-by-one using one pin, or the method of forming a number of slurry supply holes at a time using pin support-like pins having a predetermined shape in conformity with the pitch of cells. Incidentally, in respect of flexible approach with respect to the honeycomb base material in which the pitch or the opening shape of cells is not constant, preferred is the method in which the end face of the honeycomb base material is subjected to image processing, the position of the cell in which the slurry supply hole is formed is extracted, and the slurry supply hole is pierced at a portion corresponding to the above-mentioned extracted position using the laser marker.

Incidentally, in the case of attaching the masking film to both end faces (the first and second end faces) of the honeycomb base material, the slurry supply hole is preferred to be formed at portions corresponding to one open end of the predetermined cell and the other open end of the remaining cell, and the slurry supply holes are particularly preferred to be formed so as to be in checker wise patterns complementary between at one open end of the predetermined cell and at the other open end of the remaining cell.

[3] Plugging Process (Formation of the Plugging Portion):

The method of manufacturing a plugged honeycomb structure according to the present embodiment has the plugging process including the steps of: immersing one end (the first end) of the honeycomb base material in the plugging slurry while vibrating the plugging slurry; after bringing the internal part of the cell into a negative pressure and then returning it into an atmospheric pressure, vibrating the plugging slurry to make the plugging slurry enter the first open end of the cell; and drying the plugging slurry having entered the first open end of the cell to form the first plugging portion at the first end.

In the plugging process, first, one end (the first end) of the honeycomb base material having been manufactured is immersed in the plugging slurry while this plugging slurry is vibrated.

There are no particular restrictions on the kind of the plugging slurry for use in the method of manufacturing the plugged honeycomb structure according to the present embodiment, but can be, for example, the one to be prepared by mixing a ceramic powder and slurry dispersant.

The above-mentioned ceramic powder is the powder containing ceramics such as silicon carbide powder or cordierite powder, and insofar as it is such powder, is not limited in its kind, but, for example, silicon carbide powder, cordierite powder or the like may preferably be employed. In addition, preferred examples of the above-mentioned slurry dispersant include an organic solvent such as acetone, methanol or ethanol, or water. Further, it is preferable that the above-mentioned plugging slurry is added with additives such as a binder or a deflocculant. The binder can employ resins such as polyvinyl alcohol (PVA), and a thermally gelled and set binder having properties of being gelled by heating is preferably used. This binder having thermally gelled and set properties can preferably employ, for example, methyl cellulose.

The above-mentioned plugging slurry is preferably 1 to 1,000 dPa·s in viscosity, further preferably 5 to 500 dPa·s, and particularly preferably 10 to 100 dPa·s. When the viscosity of the plugging slurry is below 1 dPa·s, even if it is supplied (entered) in the slurry supply hole, there is a fear that fluidity is too high and it is not retained in the vicinity of the end. On the other hand, when it exceeds 1,000 dPa·s, owing to a low fluidity, there is a fear that the plugging slurry is not sufficiently supplied (entered) to a predetermined depth in the slurry supply hole. Here, in the present specification, "viscosity of plugging slurry" is a value that is measured using a vibratory viscometer. "FVM-80A" manufactured by CBC Materials corn may be used as the oscillation viscometer.

In this process, one end of the honeycomb base material is immersed in plugging slurry while this plugging slurry is vibrated. That is, it is necessary to vibrate the plugging slurry when one end of the honeycomb base material is immersed in the plugging slurry. The method of vibrating the plugging slurry is not particularly limited, but, for example, an ultrasonic generator or a vibrating screen can be used. Furthermore, the vibration condition at this time is not particularly limited, but can be conditions of up and down in a vertical direction, the number of vibrations of 1 to 1,000,000 Hz and amplitude of 0.001 m to 50 mm.

Incidentally, in this process, after one end of a honeycomb base material is immersed in plugging slurry while this plugging slurry is vibrated, it is preferable that the plugging slurry continues to vibrate or stops to vibrate.

In addition, plugging slurry is preferred to employ the one having thixotropic properties in respect that it enters the slurry supply hole sufficiently and the slurry is retained well in the vicinity of the end in the cell. In the case of using this plugging slurry having thixotropic properties, it is preferred that by the addition of vibration to the above-mentioned plugging slurry using the ultrasonic generator, the vibrating screen or the like, before the honeycomb base material is immersed, the plugging slurry has preliminarily been gelled. The vibration condition at this time (conditions of the addition of vibration for causing the plugging slurry to be gelled) is not particularly limited, but may be conditions of up and down in a vertical direction, the number of vibrations of 1 to 1,000,000 Hz and amplitude of 0.001 to 50 mm.

When one end of the honeycomb base material is immersed in the plugging slurry, there are no particular restrictions on the depth of immersion of the honeycomb base material, but from the viewpoint that the depth of the plugging portion can be controlled, the honeycomb base material is preferred to be immersed in the plugging slurry to the desired depth of the plugging portion of the plugged honeycomb structure intended to be manufactured. The depth of the plugging portion, although depending on the plugged honeycomb structure to be manufactured, in the case of manufacturing the plugged honeycomb structure of a diameter of 100 to 500 mm and a length of 100 to 500 mm, is normally 1 to 50 mm, preferably 2 to 10 mm.

Subsequently, in this plugging process, the internal part of the cell is brought into a negative pressure. That is, in the method of manufacturing the plugged honeycomb structure according to the present embodiment, one end of the honeycomb base material is immersed in plugging slurry while this plugging slurry is vibrated, and thereafter the internal part of the cell is brought into a negative pressure. When the internal part of the cell is brought into a negative pressure in such way, removed can be air having entered (entered air) between the end face of the honeycomb base material and the plugging slurring surface when one end of the honeycomb base material is immersed in the plugging slurry. When the entered air is removed, since the plugging slurry enters the cell well, as well as distances from the open ends of cells of the plugging slurry having been entered in each cell come to be uniform, an advantage exists in that fluctuations in the depth of the plugging portion is less likely to occur.

Furthermore, in the method of manufacturing a plugged honeycomb structures according to the present embodiment, when the internal part of the cell is brought into a negative pressure, it is preferred that a gap is formed between the film and the above-mentioned opposite face of the honeycomb base material, to prevent the internal part of the cell from being fully sealed. Conventionally, when the masking film is attached to both end faces (the first and second end faces) of the honeycomb base material, since this film acts as a lid, when the plugging slurry enters the cell, the air in the cell exerts a reaction force on the plugging slurry intended to enter the cell. Therefore, owing to that amounts of the plugging slurry having entered each cell is non-uniform, there are some cases in which fluctuations in depth of the plugging portion occur, or skipped plugging occur. As is the present embodiment, however, since by bringing the internal part of the cell into a negative pressure, the reaction force exerted by the air in the above-mentioned cell can be decreased, it is possible to prevent the occurrence of fluctuations in depth of the plugging portion or the occurrence of skipped plugging.

The method of bringing the internal part of the cell into a negative pressure is not particularly limited, but an example thereof includes, as is illustrated in FIG. 1A, the method in which using a negative pressure source unit 40 that is provided with a funnel 41 that has an opening covering the other end face of the honeycomb base material 10 and that can form a sealed space with respect to the above-mentioned end face, and a vacuum pump 42 connected to the funnel 41, air in the internal part of the cell 12*a* is sucked.

The pressure (internal pressure) in the internal part of the cell when the internal part of the cell is brought into a negative pressure is not particularly limited, but is preferably in the state of at 0.1 to 100 kPa for 0.1 to 60 seconds, further preferably in the state of at 1 to 50 kPa for 0.3 to 30 seconds, particularly preferably in the state of at 10 to 20 kPa for 1 to 10 seconds. When the above-mentioned pressure is below 0.1 kPa, there is a fear that the partition wall forming cell is broken by an external atmospheric pressure. On the other hand, when it exceeds 100 kPa, there is a fear that it takes too much time period to remove an air having entered (entered air) between the end face of the honeycomb base material and the plugging slurry surface. Further, when the above-mentioned time period is below 0.1 seconds, there is a fear that the air having entered (entered air) between the end face of the honeycomb base material and the plugging slurry surface cannot be removed up. Whereas, when it exceeds 60 seconds, there is a fear that productivity is considerably reduced.

"The internal part of the cell is brought into a negative pressure" is referred to as that the pressure in the internal part of the cell is brought into a pressure lower than an atmospheric pressure. For example, FIG. 1A is an example illustrating the state in which the air in the cell 12*a* is discharged to the outside of the cell 12*a* through a gap resided between the second end face 14 of the honeycomb base material 10 and the masking film 11. Incidentally, as is illustrated in FIG. 1A, the air in the cell 12*a* is discharged to the outside of the cell 12*a* through the gap resided between the second end face 14 of the honeycomb base material 10 and the masking film 11 as is shown by a flow 16 of the air. When the internal part of the cell is brought into a negative pressure as is described above, removed can be the air having entered (entered air) between the first end face 13 of the honeycomb base material 10 and the surface of the plugging slurry 20 when the first end 13 of the honeycomb base material 10 is immersed in the plugging slurry 20. Therefore, an advantage exits in that the plugging slurry 20 enters the cell 12*a* well, depths of the plugging slurry 20 having entered each cell 12*a* come to be uniform, and fluctuations in the depth of a plugging portion are less likely to occur.

Figure 1B:
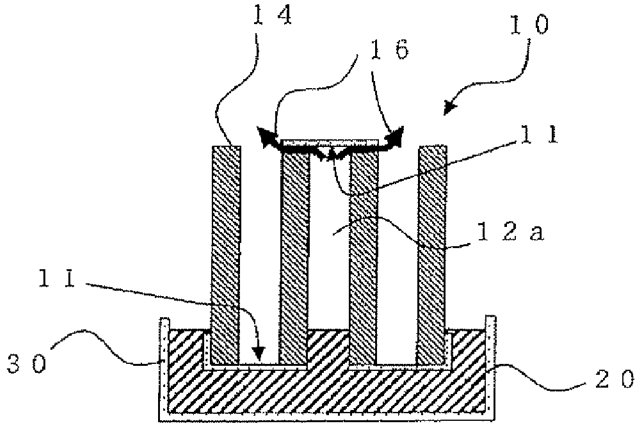
FIG. 1B is a schematic diagram illustrating one embodiment of a method of manufacturing a plugged honeycomb structure according to the present invention.

Next, in this process, after the internal part of the cell is brought into a negative pressure as described above, the internal part of the cell is returned into an atmospheric pressure. The method in which the internal part of the cell is returned into an atmospheric pressure is not particularly limited. For example, FIG. 1B is an example in which by detaching the funnel 41 of the negative pressure source unit 40 from the honeycomb base material 10, a differential pressure having been generated between the internal part of the cell 12*a* and the outside air is eliminated, and the internal part of the cell 12*a* is brought into an atmospheric pressure. When the internal part of the cell is returned into an atmospheric pressure as is described above, the plugging slurry enters the cell to the depth at which the end of the honeycomb base material is immersed in the plugging slurry. By returning the internal part of the cell into an atmospheric pressure as is described above, the depth of the plugging portion can be controlled so as to be at the desired depth. On the assumption that the internal part of the cell remains in the state of at a negative pressure, a time period for the plugging part to have reached the desired depth can be shortened, but the depth of the plugging portion cannot be controlled.

Subsequently, in this process, the internal part of a cell is returned into an atmospheric pressure, thereafter the plugging slurry is vibrated, and the plugging slurry is made to enter the end of the cell. By causing the plugging slurry to vibrate, the plugging slurry can be made to enter all the cells corresponding to positions in which the slurry supply hole is formed (that is, there is formed the open end). In addition, the plugging slurry can be made to uniformly enter the cell. FIG. 1B is an example illustrating the state in which the plugging slurry having been vibrated by an ultrasonic generator 30 has entered to the depth at which the honeycomb base material 10 is immersed in the plugging slurry 20. Here, accompanied by that the plugging slurry 20 enters the cell 12*a*, the air to be pushed out to the outside of the cell 12*a* is easily discharged through the gap resided between the second end face 14 of the honeycomb base material 10 and the masking film 11. Incidentally, as thus illustrated in FIG. 1B, the air in the cell 12*a* is discharged to the outside of the cell 12*a* through the gap resided between the second end face 14 of the honeycomb base material 10 and the masking film 11 as is shown by a flow 16 of the air.

The method of vibrating the plugging slurry after the plugging slurry has been made to enter the end of the cell can be conducted by the same method as the method of vibrating the plugging slurry when one end of the honeycomb base material is immersed in the plugging slurry.

The condition of vibrating the plugging slurry is not particularly limited, but may be preferably conditions of up and down in a vertical direction, the number of vibrations of 1 to 1,000,000 Hz and amplitude of 0.001 to 50 mm, further preferably conditions of up and down in a vertical direction, the number of vibrations of 5 to 500,000 Hz and amplitude of 0.005 to 25 mm, particularly preferably conditions of up and down in a vertical direction, the number of vibrations of 10 to 100,000 Hz and amplitude of 0.01 to 10 mm. When the above-mentioned number of vibrations is below 1 Hz, since the plugging slurry is not sufficiently gelled, there is a fear that the plugging slurry does not enter the cell sufficiently. On the other hand, when it exceeds 1,000,000 Hz, there is a fear that heat is generated by the friction between grains, and the plugging slurry is changed in quality (for example, separated or dried). In addition, when the amplitude is below 0.001 mm, since the plugging slurry is not gelled sufficiently, there is a fear that the plugging slurry does not enter the cell sufficiently. On the other hand, when the amplitude exceeds 50 mm, there is a fear that the plugging slurry is scattered from the container of the vibration generator, the vibrating screen or the like.

Next, in the present process, the plugging slurry having entered the cell is dried to form the first plugging portion at the end of the cell. This method of drying the plugging slurry is preferably employs the same method as the method of drying the above-described honeycomb formed body. A time period of drying the above-mentioned plugging slurry is not particularly limited, but is preferably 0.1 to 60 minutes, further preferably 0.2 to 30 minutes, particularly preferably 0.5 to 10 minutes. When the above-mentioned drying time period is below 0.1 minutes, owing to insufficient drying, there is a fear that when the masking film is peeled off, a part of the portion that will be the plugging portion is peeled off along with the above-mentioned film and a concave portion is formed. Whereas, when it exceeds 60 minutes, there is a fear that productivity is considerably reduced.

Furthermore, a drying temperature of the above-mentioned plugging slurry is not particularly limited, but is preferably 10 to 300° C., further preferably 20 to 200° C., particularly preferably 50 to 150° C. When the above-mentioned drying temperature is below 10° C., there is a fear that it takes too much time period to make a sufficient drying. On the other hand, when it exceeds 300° C., there is a fear that the honeycomb base material is changed in quality by heating.

In the method of manufacturing a plugged honeycomb structure according to the present embodiment, as is described above, after the plugging portion has been formed at one end (the first end) of the honeycomb base material, further the plugging portion can be formed at the other end (the second end). In specific, the first end on the first end face side of the honeycomb base material is immersed in the plugging slurry, the internal part of the cell is brought into a negative pressure, the internal part of the cell is returned into an atmospheric pressure, the plugging slurry is vibrated, the plugging slurry having entered the end of the cell is dried, and eventually the first plugging portion is formed; and thereafter, the second end on the second end face side of the honeycomb base material is immersed in the plugging slurry, the internal part of the cell is brought into a negative pressure, the internal part of the cell is returned into an atmospheric pressure, the plugging slurry is vibrated, and the plugging slurry having entered the end of the cell is dried, and eventually the second plugging portion can be formed.

Figure 1C:
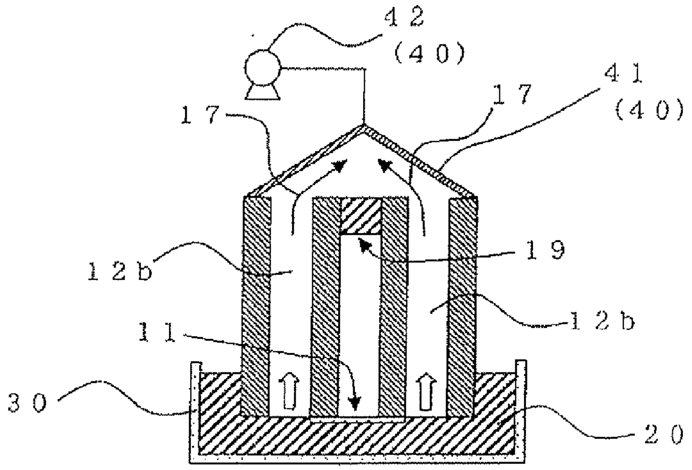
FIG. 1C is a schematic diagram illustrating one embodiment of a method of manufacturing a plugged honeycomb structure according to the present invention.

In specific, the second plugging portion can be formed as follows. That is, after a first plugging portion 19 has been formed in accordance with the method illustrated in FIGS. 1A and 1B, as is illustrated in FIG. 1C, using the honeycomb base material 10 which masking film 11 having been attached to the first end face 13 is peeled off, the second end on a second end face side 14 of the honeycomb base material 10 is immersed in the plugging slurry 20, and an internal part of a cell 12*b* is brought into a negative pressure using the above-described negative pressure source unit 40. By such operations, removed can be an air having entered (entered air) between the second end face 14 of the honeycomb base material 10 and the surface of the plugging slurry 20 when the second end face (the other end) 14 of the honeycomb base material 10 is immersed in the plugging slurry 20. When the entered air is removed, an advantage exists in that the plugging slurry 20 enters the cell 12*b* well, as well as distances from the open ends of cells of the plugging slurry 20 having entered each cell 12*b* are uniform. Incidentally, as is illustrated in FIG. 1C, the air in the cells 12*b* is discharged from the cells 12*b* as is shown by a flow 17 of the air.

Incidentally, after the first plugging portion 19 has been formed, the masking film 11 having been attached to the first end face 13 may not be peeled off, but when the first plugging portion 19 is formed, the slurry 20 enters between the first end face 13 and the film 11, and in some cases, owing to the entered slurry 20, the first end face 13 and the film 11 may be brought in close adhesion. In such case, there is much fear that there is no escape of the air in the cell, and fluctuations in the depth of a plugging portion occur or skipped plugging occurs. In consideration of such cases, it is preferred to peel off the masking film 11 after the first plugging portion 19 has been formed.

Incidentally, the condition of bringing the internal part of the cell 12*b* into a negative pressure after the plugging portion has been formed at one end portion (the first end) of the honeycomb base material can be the same as is the above-described case in which the plugging portion is formed at the first end.

Figure 1D:
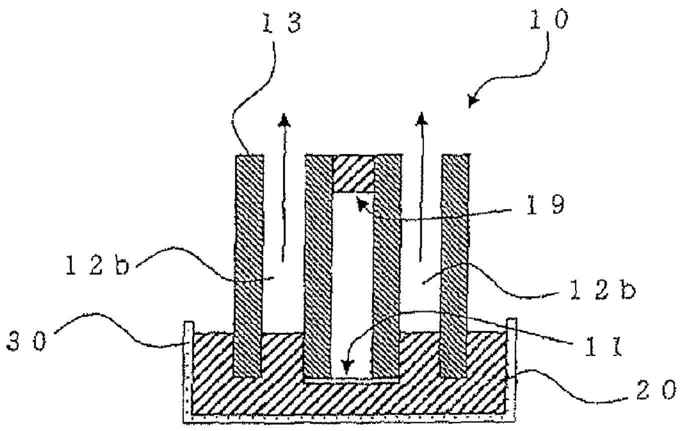
FIG. 1D is a schematic diagram illustrating one embodiment of a method of manufacturing a plugged honeycomb structure according to the present invention.
Figure 2:
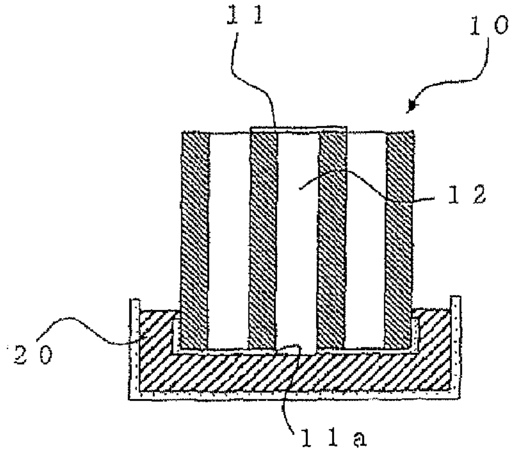
FIG. 2 is a schematic diagram illustrating a conventional state in which plugging slurry is made to enter an open end of a cell.

Thereafter, as is illustrated in FIG. 1D, the negative pressure source unit 40 is detached from the honeycomb base material 10, the internal part of the cell 12*b* is returned into an atmospheric pressure, the plugging slurry 20 is vibrated using the ultrasonic generator 30, and the plugging slurry 20 is made to enter the internal part of the cell 12*b*. The plugging slurry 20 having entered is dried, and the second plugging portion is formed.

Incidentally, the condition of vibrating the plugging slurry and the condition of drying the plugging slurry is not particularly limited, and can be the above-described condition.

Incidentally, in the plugged honeycomb structure to be manufactured by the method of manufacturing a plugged honeycomb structure according to the present embodiment, it is preferred that the plugging portion is formed at one open end of the predetermined cell and at the other open end of the remaining cell. It is particularly preferred that the plugging portions to be formed at one open end of the predetermined cell and at the other open end of the remaining cell are disposed so as to form complementary checkerboard patterns.

[4] Firing:

Subsequently, the honeycomb base material in which dried plugging has been formed is calcined (fired), whereby the plugged honeycomb structure can be obtained. Incidentally, preferably calcination is made before firing and a calcinated body is manufactured. “Calination” means an operation of burning organic substances (organic binder, dispersant, pore-forming material and the like) in the honeycomb base material and removing them. In general, the temperature at which an organic binder is burnt is about 100 to 300° C. and the temperature at which a pore-forming material is burnt is about 200 to 800° C., so that it is preferable that the temperature of calcination is about 200 to 1000° C. The time period of calcination is not particularly limited, but is normally about 10 to 100 hours.

Since the firing condition (temperature and time period) of firing differs depending on the kind of forming raw materials, a proper condition may be selected in accordance with the kind thereof, but in the case of firing cordierite raw materials, it is preferred to be fired at 1410 to 1440° C. In addition, it is preferred to be fired for about 3 to 10 hours. By this firing, forming raw materials in the calcinated body are sintered and come to be fine, and a predetermined strength can be obtained.

EXAMPLE

Hereinafter, specific descriptions will be made based on examples according to the present invention, but the present invention is not limited to the following examples.

Example 1

First, 44 parts by volume of talc, 22 parts by volume of kaolin, 19 parts by volume of alumina and 15 parts by volume of silica were mixed and a cordierite raw material was prepared. With respect to 100 parts by mass of this cordierite raw material, 30 parts by mass of water, 6 parts by mass of organic binder (methylcellulose) and 25 parts by mass of graphite acting as a pore-forming material were added, and all the components were mixed and kneaded to form clay.

The clay having been prepared was subjected to extrusion forming, and a honeycomb formed body which cell cross sectional shape is square (length of one side is 1 mm), the thickness of which partition wall is about 0.3 mm and which is a cylindrical shape of 5.66 inch diameter and 6 inch length was manufactured. Thereafter, this honeycomb formed body was dried using a microwave dryer and fully dried using a hot-air dryer to obtain a honeycomb base material. The honeycomb base material having been obtained was cut at both end faces in a predetermined dimension.

Next, the honeycomb base material having been obtained was subjected to plugging processing. Before the honeycomb base material was plugged, plugging slurry had preliminarily been prepared. This plugging slurry was obtained by adding 1.5 parts by mass of methylcellulose, 8 parts by mass of glycerin and 40 parts by mass of water with respect to 100 parts by mass of a cordierite powder and kneading them. The viscosity of the plugging slurry having been obtained was 50 dPa·s.

A masking film was attached to both end faces of the above-mentioned honeycomb base material, and holes were pierced in a checker wise pattern in the masking film so as to form complementary checker wise patterns between at one end face and at the other end face of the honeycomb base material. Incidentally, the above-mentioned film employed a tape that is provided with an adhesive layer (adhesion force is 5.3 N/cm) that is made of acrylic adhesive agent formed on a polyester base material.

When one end (the fist end face) of the honeycomb base material was immersed at a depth of 5 mm in the plugging slurry, at the same time, as is illustrated in FIG. 1A, with respect to the other end face (the second end face 14), the funnel 41 of the negative pressure source unit 40 that is provided with the funnel 41 and the vacuum pump 42 was brought in close adhesion, using the vacuum pump 42, an air in the internal part of the cell 12_a_ of the honeycomb base material 10 was sucked, and the internal part of the cell 12_a_ was made to be as a negative pressure. After two seconds had passed since suction, the funnel 41 was detached from the honeycomb base material 10 (that is, the condition of bringing it into a negative pressure was two seconds at 20 kPa) and the honeycomb base material 10 was open to atmosphere (the internal part of the cell was returned into an atmospheric pressure) (FIG. 1B). Thereafter, the plugging slurry 20 was vibrated using the ultrasonic generator 30, the honeycomb base material 10 was taken out of the plugging slurry 20 after 20 seconds have passed since that it was open to atmosphere as is described above, and it was subjected to drying on the conditions of at a temperature of 120° C. and for a time period of 3 minutes using a hot-air dryer.

After drying, the masking film 11 having been attached to the end face (the first end face 13) on the side where plugging has been made was peeled off. Thereafter, the other end (the end on the second end face 14 side) of the honeycomb base material 10 was immersed at a depth of 5 mm in the plugging slurry 20, at the same time, as is illustrated in FIG. 1C, the funnel 41 of the negative pressure source unit 40 that is provided with the funnel 41 and the vacuum pump 42 was brought in close adhesion to the first end face 13, an air in the internal part of the cell 12_b_ of the honeycomb base material 10 was sucked at 20 kPa degrees of vacuum using the vacuum pump 42, and the internal part of the cell 12_b_ was brought into a negative pressure. After two seconds had passed since the start of suction, the funnel 41 was detached from the honeycomb base material 10 and the honeycomb base material 10 was open to atmosphere (the internal part of the cell was returned into an atmospheric pressure) (FIG. 1D). Thereafter, the plugging slurry 20 was vibrated using the ultrasonic generator 30, the honeycomb base material 10 was taken out of the plugging slurry 20 after 20 seconds had passed since that it was open to atmosphere as is described above, and it was subjected to drying on the conditions of at a temperature of 120° C. and for a time period of 3 minutes using a hot-air dryer. Thereafter, by firing, a plugged honeycomb structure was obtained. The firing conditions were 1410 to 1440° C. and 5 hours.

In the plugged honeycomb structure having been obtained, the depth of the first plugging portion was 4.85 mm and its standard deviation $\sigma$ was 0.10, and the depth of the second plugging portion was 4.97 mm and its standard deviation $\sigma$ was 0.13. Incidentally, the sample standard deviation $\sigma$ of the depth of the first plugging portion was calculated by selecting 17 points of plugging portions without deviation from about 3,800 numbers of plugging portions having been formed on the first end face side of the plugged honeycomb structure having been obtained, and measuring their depths. The sample standard deviation $\sigma$ of the depth of the second plugging portion was calculated in the same way.

Incidentally, in cases in which the honeycomb base material was taken out of the plugging slurry after 1, 5, 10 and 15 seconds had passed since that it was open to atmosphere to form the plugging portion, the depths of respective plugging portions were measured and their standard deviations were calculated. Measurement results are shown in Table 1.

TABLE 1

| | | Example 1 time after open to atmosphere | | | | | Comparative Example 1 |
|---|---|---|---|---|---|---|---|
| | | 1 second | 5 seconds | 10 seconds | 15 seconds | 20 seconds | 20 seconds |
| the first plugging portion | depth of plugging portion (mm) | 1.75 | 3.26 | 4.78 | 4.80 | 4.85 | 2.64 |
| | standard deviation ($\sigma$) | 0.74 | 0.65 | 0.40 | 0.20 | 0.10 | 0.25 |
| the second plugging portion | depth of plugging portion (mm) | 2.29 | 3.58 | 4.83 | 4.86 | 4.97 | 1.24 |
| | standard deviation ($\sigma$) | 0.64 | 0.47 | 0.31 | 0.24 | 0.13 | 0.78 |

Example 2

Except for 35 parts by mass of water on the occasion of preparation of the plugging slurry, a plugged honeycomb structure was manufactured as is Example 1. Incidentally, the viscosity of the plugging slurry having been prepared was 100 dPa·s. The depths of the first and second plugging portions of the plugged honeycomb structure having been manufactured were measured, and their standard deviations were calculated. These results are shown in Table 2. In cases in which the honeycomb base material was taken out of the plugging slurry after 1, 5, 10 and 15 seconds had passed since that it was open to atmosphere, the depths of respective plugging portions were measured and their standard deviations were calculated. Measurement results are shown in Table 2.

TABLE 2

| | | Example 2 time after open to atmosphere | | | | | Comparative Example 2 |
|---|---|---|---|---|---|---|---|
| | | 1 second | 5 seconds | 10 seconds | 15 seconds | 20 seconds | 20 seconds |
| the first plugging portion | depth of plugging portion (mm) | 1.33 | 2.18 | 3.46 | 4.78 | 4.87 | 1.94 |
| | standard deviation (σ) | 0.45 | 0.37 | 0.32 | 0.25 | 0.13 | 0.31 |
| the second plugging portion | depth of plugging portion (mm) | 1.71 | 2.45 | 3.67 | 4.84 | 4.96 | 0.46 |
| | standard deviation (σ) | 0.48 | 0.34 | 0.22 | 0.18 | 0.12 | 0.38 |

Comparative Example 1

Except that an internal part of a cell is not brought into a negative pressure when plugging is formed (in a plugging process), a plugged honeycomb structure was manufactured as is Example 1. The depths of the first and second plugging portions of the plugged honeycomb structure having been manufactured were measured and their standard deviations were calculated. These results are shown in Table 1.

Comparative Example 2

Except that an internal part of a cell is not brought into a negative pressure when plugging is formed (in a plugging process), a plugged honeycomb structure was manufactured as is Example 2. The depths of the first and second plugging portions of the plugged honeycomb structure having been manufactured were measured and their standard deviations were calculated. These results are shown in Table 2.

Figure 3:
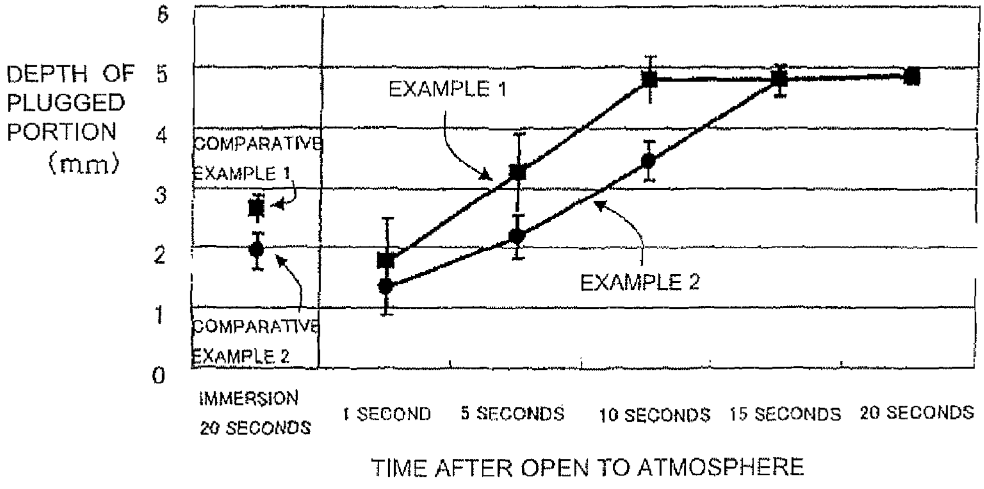
FIG. 3 is a graph representing a relationship between a time periods from that the honeycomb base material is open to atmosphere to that it is taken out of the plugging slurry and a depth of the first plugging portion.

FIG. 3 is a graph showing the relationship between a time period from that a honeycomb base material is open to atmosphere to that it is taken out of the plugging slurry (1, 5, 10, 15 and 20 seconds) and the depth of the first plugging portion in the plugged honeycomb structure of Examples 1 and 2, and Comparative Examples 1 and 2. Further, as to the plugged honeycomb structures of Comparative Examples 1 and 2, shown is the case in which a time period from that the honeycomb base material is open to atmosphere to that it is taken out of the plugging slurry is to be 20 seconds.

Figure 4:
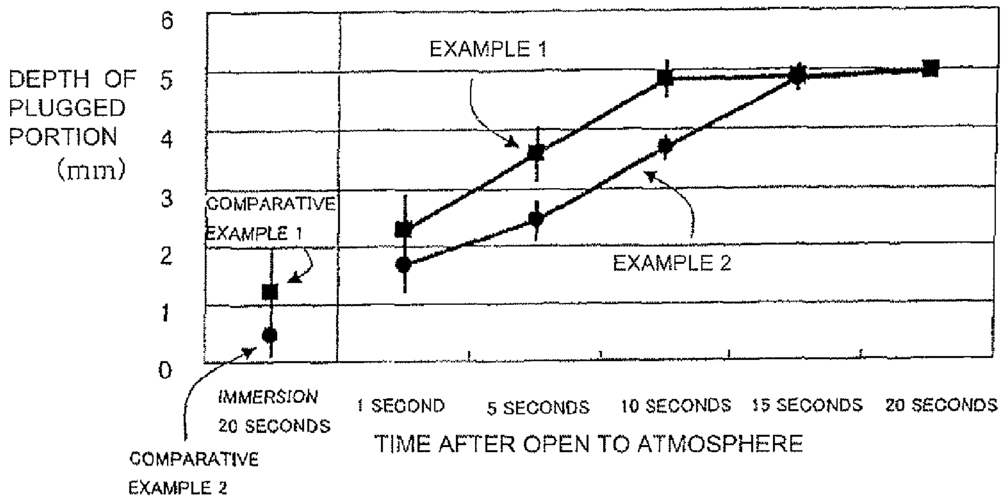
FIG. 4 is a graph representing a relationship between a time periods from that the honeycomb base material is open to atmosphere to that it is taken out of the plugging slurry and a depth of the second plugging portion.

FIG. 4 is a graph showing the relationship between a time period from that a honeycomb base material is open to atmosphere to that it is taken out of the plugging slurry (1, 5, 10, 15 and 20 seconds) and the depth of the second plugging portion of the plugged honeycomb structures of Examples 1 and 2, and Comparative Examples 1 and 2. Further, as to the plugged honeycomb structure of Comparative Examples 1 and 2, shown is the case in which a time period from that the honeycomb base material is open to atmosphere to that it is taken out of the plugging slurry is to be 20 seconds.

As is shown above, in the plugged honeycomb structures of Examples 1 and 2, as compared to the plugged honeycomb structures of Comparative Examples 1 and 2, it was confirmed that the standard deviations of the depth of the plugging portion to be formed in the case in which the time period from that the honeycomb base material is open to atmosphere to that it is taken out of the plugging slurry is to be 20 seconds are small, the plugging slurry can be made to enter uniformly to the desired depth of the cell, and product defects such as skipped plugging is much less likely to occur. Furthermore, in the plugged honeycomb structures of Examples 1 and 2, as compared to the plugged honeycomb structure of Comparative Examples 1 and 2, since the plugging slurry can easily reach the desired depth of a cell, the time period for manufacturing can be shortened.

INDUSTRIAL APPLICABILITY

According to the method of manufacturing a plugged honeycomb structure of the present invention, the plugged honeycomb structure can be preferably manufactured in which plugging slurry can be made to enter uniformly to the desired depth of the cell, and product defects such as skipped plugging are much less likely to occur.

The invention claimed is:

1. A method of manufacturing a plugged honeycomb structure to manufacture a plugged honeycomb structure provided with a tubular honeycomb base material in which a plurality of cells is partitioned and formed by a porous partition wall and a plugging portion that is disposed at an open end of each cell, the method comprising a plugging process including the steps of:

immersing one end (a first end) of the honeycomb base material in a plugging slurry while vibrating the plugging slurry;

after the first end of the honeycomb base material is immersed, either continuing to vibrate the plugging slurry or halting the vibration of the plugging slurry;

after bringing an internal part of the plurality of cells to a negative pressure and then returning the internal part of the plurality of cells to an atmospheric pressure, either continuing or resuming vibrating the plugging slurry to make the plugging slurry enter a first open end of each of one or more cells of the plurality of cells; and drying the plugging slurry having entered the first open end of each of the one or more cells to form a first plugging portion at the first end.

2. The method of manufacturing a plugged honeycomb structure according to claim 1, wherein the one end of the honeycomb base material is immersed in the plugging slurry to a depth corresponding to a depth of the first plugging portion of the plugged honeycomb structure to be manufactured.

3. The method of manufacturing a plugged honeycomb structure according to claim 1, further comprising, before the plugging process, a masking process in which a masking film is attached to a first and a second end face of the honeycomb base material, and a slurry supply hole is pierced at a portion corresponding to each first open end of one or more predetermined cells of the plurality of cells and each second open end of the remaining cells of the plurality of cells, the plugging process including the steps of:

after forming the first plugging portion at the first end, immersing a second end on a second end face side of the honeycomb base material in the plugging slurry while vibrating the plugging slurry;

after the second end of the honeycomb base material is immersed, either continuing to vibrate the plugging slurry or halting the vibration of the plugging slurry;

after bringing the internal part of the plurality of cells to a negative pressure and then returning the internal part of the plurality of cells to an atmospheric pressure, either continuing or resuming vibrating the plugging slurry to make the plugging slurry enter each second open end of the remaining cells; and drying the plugging slurry having entered each second open end of the remaining cells to form a second plugging portion at the second end.

4. The method of manufacturing a plugged honeycomb structure according to claim 3, wherein the second end on the second end face side of the honeycomb base material is immersed in the plugging slurry to a depth corresponding to a depth of the second plugging portion of the plugged honeycomb structure.

5. The method of manufacturing a plugged honeycomb structure according to claim 1, wherein the plugging slurry is vibrated under conditions that, after the internal part of the plurality of cells is brought to a negative pressure and then returned to an atmospheric pressure, and the plugging slurry is vibrated up and down in a vertical direction, a number of vibrations is 1 to 1,000,000 Hz and an amplitude is 0.001 to 50 mm.

6. The method of manufacturing a plugged honeycomb structure according to claim 1, wherein a condition of bringing the pressure to a negative pressure is set to be for 0.1 to 60 seconds at 0.1 to 100 kPa.

7. The method of manufacturing a plugged honeycomb structure according to claim 1, wherein a viscosity of the plugging slurry is 1 to 1,000 dPa·s.

* * * * *